United States Patent [19]
Scott et al.

[11] 3,939,748
[45] Feb. 24, 1976

[54] HYDRAULIC PUNCH PRESS WITH RAM ORIENTING MECHANISM

[75] Inventors: William B. Scott, Steward; Roger V. Sawvell, New Milford, both of Ill.

[73] Assignee: W. A. Whitney Corporation, Rockford, Ill.

[22] Filed: Feb. 13, 1974

[21] Appl. No.: 442,090

Related U.S. Application Data
[62] Division of Ser. No. 274,391, July 24, 1972, Pat. No. 3,805,658.

[52] U.S. Cl. ............... 83/639; 83/640; 83/699
[51] Int. Cl.² ........................................ B26F 1/02
[58] Field of Search ............ 83/639, 640, 699, 525, 83/823

[56] References Cited
UNITED STATES PATENTS

| | | | |
|---|---|---|---|
| 539,573 | 5/1895 | Cartwright | 83/639 |
| 2,612,951 | 10/1952 | Palmleaf | 83/639 X |
| 3,064,514 | 11/1962 | Wilson | 83/639 X |

*Primary Examiner*—Frank T. Yost
*Attorney, Agent, or Firm*—Wolfe, Hubbard, Leydig, Voit & Osann, Ltd.

[57] ABSTRACT

The punch is surrounded by a tubular housing carrying a stripper plate and having a hinged door which is latched closed unless the punch is retracted to a tool change position. In addition, means sense the position of the door and prevent automatic cycling of the punch if the door is not closed. To adjust the stripper plate vertically, provision is made of compactly nested threaded rings and, to orient the punch angularly, provision is made of an adjusting mechanism which acts on a rod projecting from the upper end of a hydraulic cylinder and connected to a downwardly projecting ram for reciprocating the punch.

9 Claims, 8 Drawing Figures

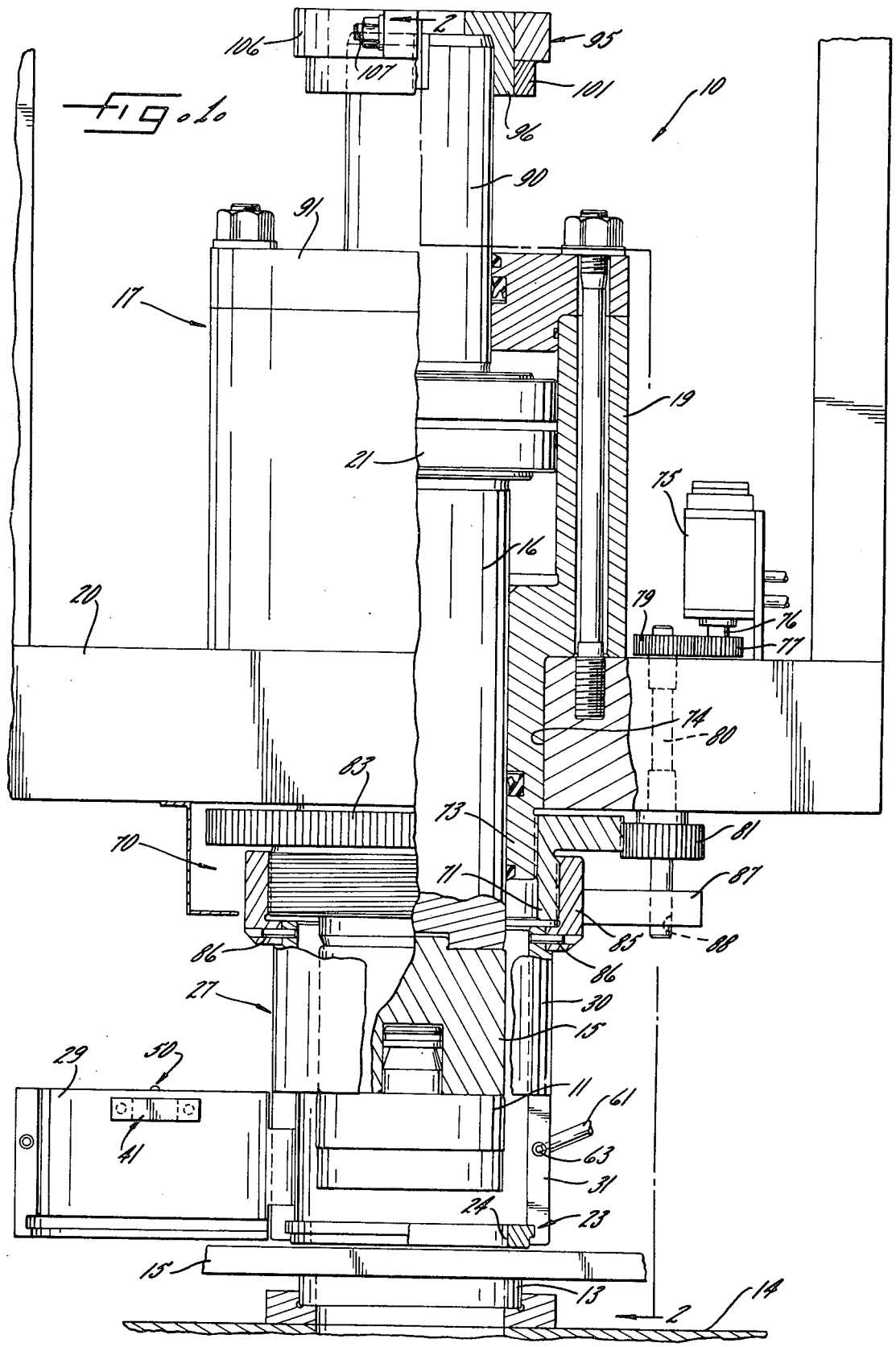

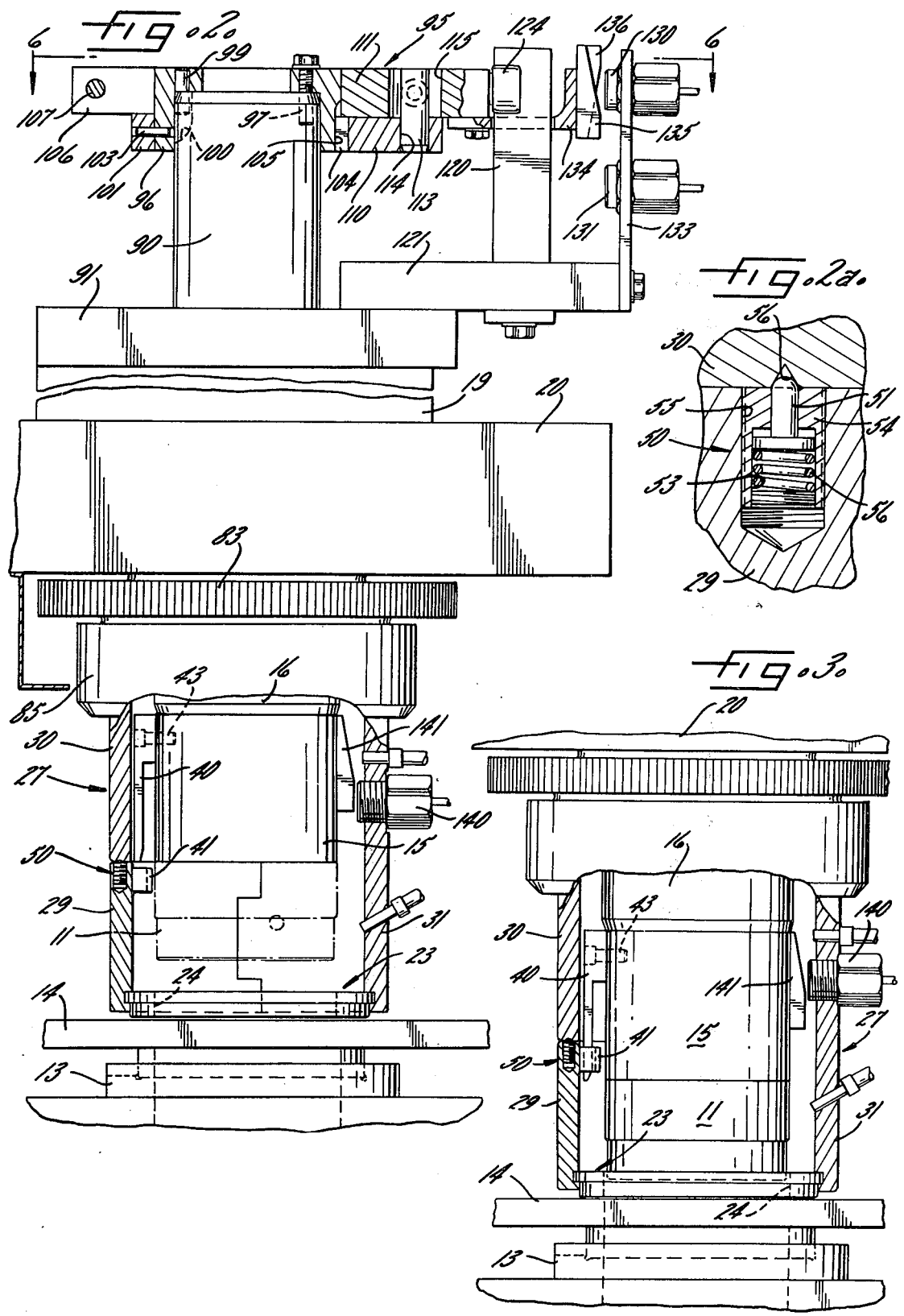

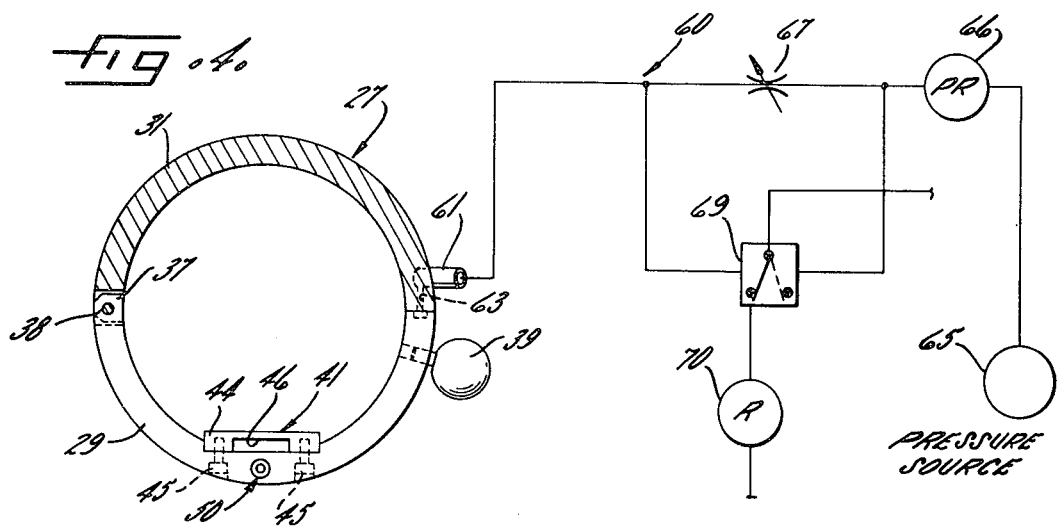
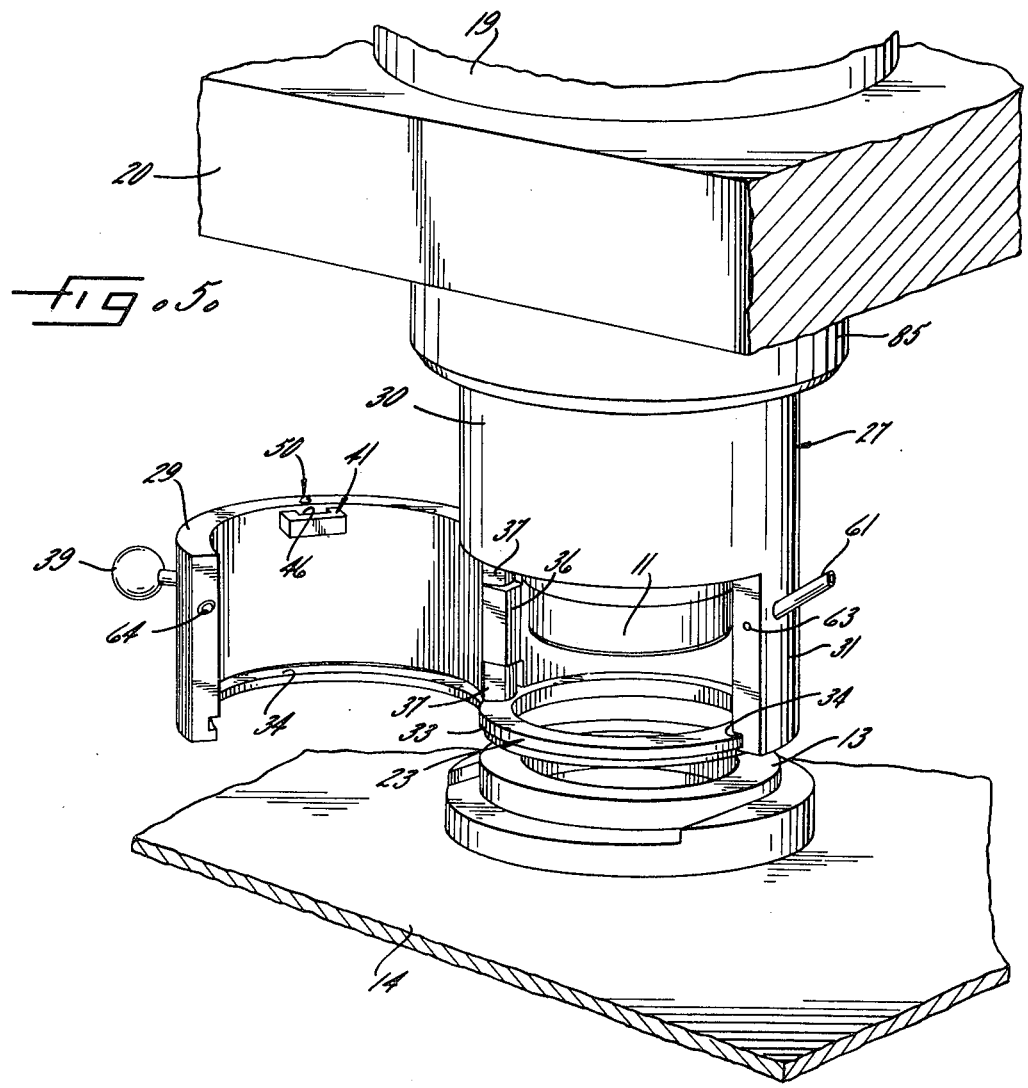

U.S. Patent  Feb. 24, 1976  Sheet 4 of 4  3,939,748
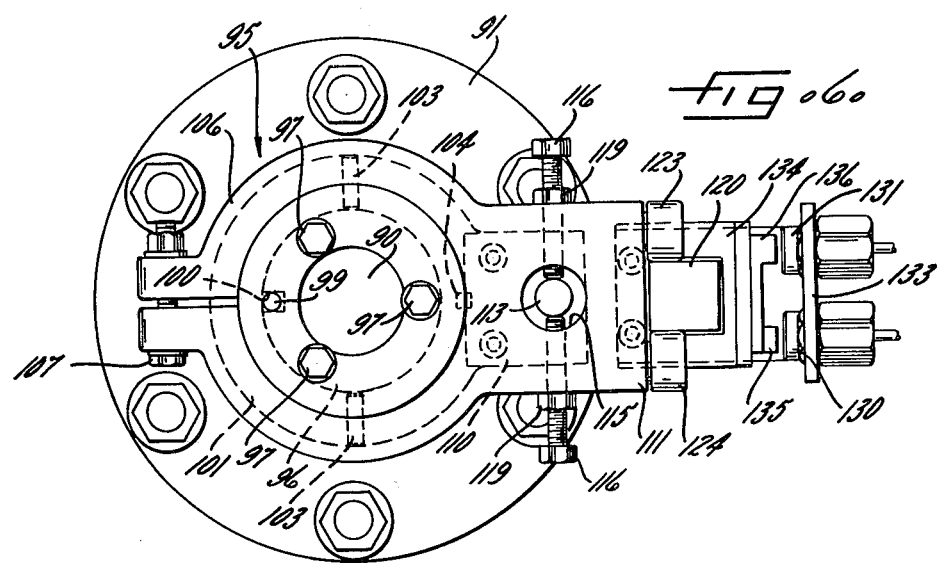
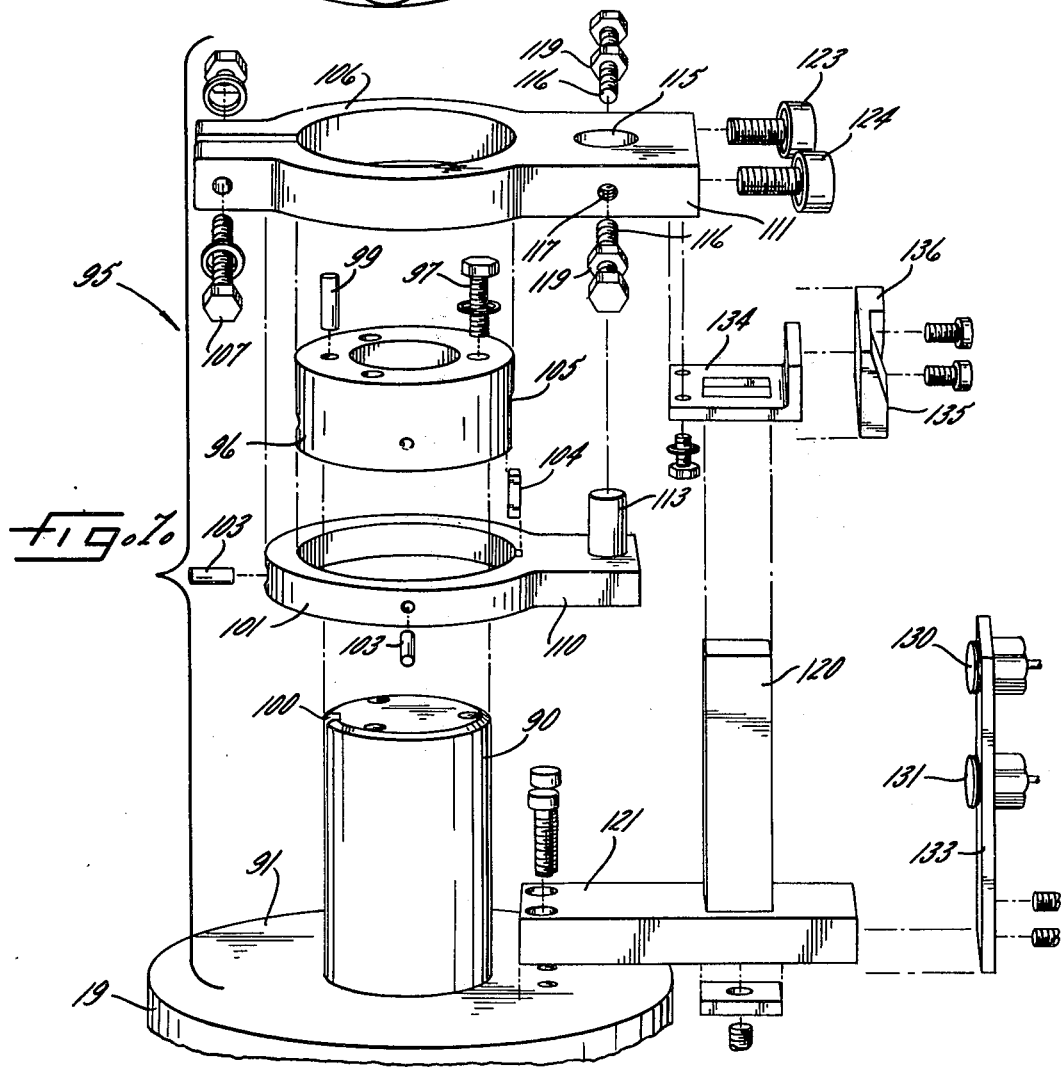

3,939,748

HYDRAULIC PUNCH PRESS WITH RAM ORIENTING MECHANISM

BACKGROUND OF THE INVENTION

This is a division of application Ser. No. 274,391, filed July 24, 1972, now U.S. Pat. No. 3,805,658.

This invention relates to a punch press with a reciprocable punch which coacts with an underlying die to punch holes in an intervening workpiece. More particularly, the invention relates to a punch press of the type in which the punch is carried on the end of a ram anchored to a piston which is adapted to be reciprocated back and forth within a cylinder in response to the admission of pressure fluid alternately into opposite ends of the cylinder. A punch press of the same general type as the present press is disclosed in Scott U.S. Pat. No. 3,720,125.

SUMMARY OF THE INVENTION

The general aim of the present invention is to provide a press whose ram is extremely rigid in a radial direction so as to reduce the bending stresses imposed on the ram and the cylinder as a result of the lateral forces exerted on the ram as the punch strikes the workpiece. In part, this is achieved through the provision of a rod projecting upwardly from the piston and journaled slidably in the upper end of the cylinder to help guide and support the ram and to better distribute to the cylinder the lateral forces exerted on the ram. In addition, the effect of such forces is reduced still further by providing a comparatively short ram whose use is made possible by decreasing the vertical spacing between the die and the bottom of the cylinder.

An important object of the invention is to decrease the aforementioned vertical spacing and to take advantage of the upwardly projecting piston rod by providing unique mechanism which is disposed above the cylinder and which acts on the upwardly projecting rod to orient and lock the ram in a proper angular position in the cylinder. With the orienting mechanism being located above the cylinder, the encumbrance beneath the cylinder is reduced thereby to enable closer positioning of the cylinder to the die so as to permit the use of a shorter ram.

The invention also is characterized by the novel and comparatively rugged construction of the orienting and locking mechanism, the latter holding the ram in a precisely established angular position and experiencing a long service life in spite of the relatively high rate of reciprocation of the ram.

These and other objects and advantages of the invention will become more apparent from the following detailed description when taken in conjunction with the accompanying drawings.

BRIEF DESCRIPTION OF THE DRAWINGS

FIG. 1 is a fragmentary front elevation of a new and improved punch press embodying the novel features of the present invention, parts of the press being broken away and shown in section.

FIG. 2 is a fragmentary cross-section taken substantially along the line 2—2 of FIG. 1.

FIG. 2A is an enlarged view of parts shown in FIG. 2.

FIG. 3 is a fragmentary view similar to FIG. 2 but showing parts in moved positions.

FIG. 4 is a radial cross-section taken through a stripper housing and diagrammatically showing a pneumatic circuit which is associated with the door of the housing.

FIG. 5 is a fragmentary perspective view of the housing and the door, the latter being shown in an open position.

FIG. 6 is a fragmentary top plan view of the press as taken along the line 6—6 of FIG. 2.

FIG. 7 is an exploded perspective view of parts shown in FIG. 6.

DETAILED DESCRIPTION OF THE PREFERRED EMBODIMENT

As shown in the drawings for purposes of illustration, the invention is embodied in a punch press 10 in which a vertically reciprocable punch 11 coacts with an underlying die 13 on the main support or bed 14 of the press to punch holes in an intervening workpiece 15. The specific press which has been illustrated is numerically controlled and is particularly suitable for performing high speed nibbling operations in which the punch nibbles away successive portions of the workpiece to form a contoured hole or to shape the edge of the workpiece.

In this instance, the punch 11 is carried in a suitable punch holder 15 attached to the lower end of a vertically reciprocable rod or ram 16 which forms part of a hydraulic actuator 17 having an upright cylinder 19 anchored to a horizontal support or mounting plate 20, the latter being rigid with the bed 14 and overhanging the die 13. The upper end of the ram 16 is connected to the lower end of a piston 21 which is reciprocated upwardly and downwardly in response to pressure fluid being alternately admitted into and dumped from opposite ends of the cylinder under the control of a suitable valve (not shown).

Overlying the die 13 and disposed just above the workpiece 15 is a circular stripper plate 23 formed with a central hole 24 through which the punch 11 reciprocates during a normal punching cycle. As the punch is retracted through its upstroke, the stationary stripper plate engages the workpiece and thus strips the workpiece from the punch.

In a typical numerically controlled cycle, the punch 11 is reciprocated through several successive working strokes and moves between advanced and retracted positions during each stroke. Thus, the punch advances sufficiently far into the die 13 to nibble off a portion of the workpiece 15 and then is retracted upwardly to the position shown in FIG. 3 in which the extreme lower end of the punch is disposed within the opening 24 in the stripper plate 23. After the workpiece has been re-positioned, the punch is again advanced downwardly through the stripper plate and into the workpiece. Upon the completion of a given nibbling operation, it may be necessary to replace the punch, the die and the stripper plate with tooling of a different size or shape before proceeding to perform the next operation. When the tooling is to be changed at the end of an operation, the numerical control automatically terminates the normal working stroke at the proper time and causes the ram 16 to retract the punch upwardly beyond its normal retracted position (FIG. 3) and to stop the punch in an upper tool change position shown in FIGS. 1 and 2. When raised to the latter position, the punch may be removed easily from the punch holder 15 by the press operator and the ram 16 cannot be reciprocated in an automatic cycle until the operator manually re-starts the numerical control.

Herein, the stripper plate 23 is mounted on the lower end of a tubular housing 27 which completely encloses the punch 11 and the ram 16 and which includes an access door 29 that cannot be opened until the punch is retracted to its upper tool change position and it is safe for the press operator to place his hands in the housing. As long as the punch is being reciprocated through its normal working stroke or is stopped out of its tool change position, the door is latched closed and cannot be opened either intentionally or inadvertently by the operator. When the punch is retracted to its tool change position, the door is automatically unlatched and may be opened for purposes of changing the punch and the stripper plate 23. Accordingly, the housing 27 protects the operator from injury and yet enables the operator to gain easy access to the punch when safe conditions prevail.

More particularly, the tubular housing 27 is of circular cross-section and is connected at its upper end to the lower end of the cylinder 19 in a manner to be described subsequently. In addition to the door section 29, the housing includes a fixed section defined by an upper cylinder 30 (see FIG. 5) and by a lower half cylinder 31 located directly beneath the cylinder and opening toward the front of the press 10. The door 29 also is shaped as a half cylinder and is hinged to one edge portion of the half cylinder 31. When the door is closed, its free edge mates with and engages the opposite edge of the half cylinder 31 and the housing thus defines a complete cylinder from its top to its bottom.

The stripper plate 23 projects just below the lower edge of the housing 27 and is formed on its upper side with a radially extending flange 33 (FIG. 5) which fits snugly but releasably into a complementary groove 34 formed around the inner side of the door 29 and the half cylinder 31. When opened, the door pulls away from the stripper plate and the latter then may be removed easily from the housing 27 simply by pulling the plate radially out of the half cylinder 31.

To mount the door 29 for hinging on the half cylinder 31, a large ear 36 (FIG. 5) is formed along one edge portion of the half cylinder and fits between a pair of vertically spaced smaller ears 37 formed on the adjacent edge portion of the door. A vertical hinge pin 38 (FIG. 4) extends through holes in the ears and is threaded at its upper end into the lower edge of the cylinder 30. The door thus swings about the pin in moving between its open and closed positions. To facilitate opening and closing of the door, a handle 39 is secured to the edge portion of the door opposite the hinge.

A latch 40 (FIGS. 2 and 3) reciprocates with the punch 11 and coacts with a strike 41 on the inner side of the door 29 to latch the latter closed unless the punch is in its tool change position shown in FIG. 2. Herein, the latch comprises an elongated finger secured to one side of the punch holder 15 by screws 43 and projecting downwardly alongside the punch holder, the finger 40 being spaced radially outwardly from the holder with its lower end located in the same plane as the lower surface of the holder. The strike 41 is located near the upper end of the door and midway between the side edges thereof and comprises a block 44 (FIG. 4) fastened to the door by screws 45 and formed with an upwardly opening hole 46 for slidably receiving the latch finger 40.

When the punch 11 is retracted upwardly to its tool change position, the latch finger 40 is spaced above the strike 41 as shown in FIG. 2 and thus the door 29 can be swung open about the hinge pin 38 to enable the operator to gain access to the punch and the stripper plate 23. When the door is closed and the punch is advanced downwardly from its tool change position, the latch finger 40 telescopes into the hole 46 in the strike and prevents the door from being opened. The latch finger remains telescoped with the strike even when the punch is shifted upwardly to its normally retracted position (see FIG. 3) during the working stroke and thus the operator cannot open the door while the punch is reciprocating or when the punch is in any position other than its tool change position. Accordingly, the danger of the operator being injured is substantially reduced since all of the reciprocating elements above the stripper plate 23 are enclosed and since access to the housing 27 cannot be gained until the punch is retracted to its tool change position to pull the latch finger 40 out of the strike 41.

Advantageously, provision is made of a releasable detent 50 (FIGS. 2 and 2A) for holding the door 29 in its closed position after the door has been shut and before the punch 11 is shifted downwardly to advance the latch finger 40 into latching engagement with the strike 41. In this instance, the detent comprises a vertical plunger 51 (FIG. 2A) which is fitted slidably into a chamber 53 formed in a screw 54 which is threaded into an upwardly opening hole 55 drilled in the upper edge of the door just outboard of the strike. A coil spring 56 is telescoped into the chamber 53 and urges the plunger 51 upwardly to a position in which the upper end of the plunger projects above the upper edge of the door. When the latter is in its closed position, the plunger seats releasably in a downwardly tapered hole 56 drilled in the lower edge of the cylinder 30 and serves to hold the door closed. After the latch finger 40 has been released and as the door is pulled opened by the operator, the plunger is automatically cammed out of the hole 56 and, when the door is re-closed, the plunger snaps into the hole to hold the door until the latch 40 subsequently telescopes into the strike 41.

Means are provided for preventing automatic cycling of the punch 11 if the door 29 is not closed and also for causing the punch to stop immediately if the door should happen to swing open during a punching cycle. Herein, these means comprise a sensing system 60 (FIG. 4) for detecting if the door is open or closed and operable when the door is open to produce an electrical signal for disabling automatic cycling of the punch.

Specifically, the sensing system 60 includes an air conduit 61 (FIGS. 4 and 5) extending into the side of the half-cylinder 31 and communicating with a drilled passage 63 which opens out of the free side edge of the half-cylinder 31. When the door is closed, the end of the passage is blocked and sealed by a rubber pad 64 located in a hole drilled in the corresponding side edge of the door 29.

During the time the door 29 is closed, the passage 63 is pressurized to a predetermined pressure with air introduced into the conduit 61 from a compressed air source 65 (FIG. 4), the air flowing through a pressure regulator 66 and an adjustable needle valve 67 before flowing into the passage. As long as the passage is blocked by the closed door 29, there is virtually no flow of air through the needle valve and thus there is little if any pressure drop across the valve. When the door is opened, however, the air escapes rapidly from the portion of the conduit 61 downstream of the needle valve and causes a much faster flow of air through the needle valve from the upstream portion of the conduit so as to create a larger pressure drop across the valve. A differential pressure switch 69 is connected in parallel with the needle valve and triggers from the position shown in full in FIG. 4 to the position shown in phantom when the differential pressure across the valve increases to a predetermined level as a result of the increased flow of air through the conduit. Upon triggering, the switch de-energizes a relay 70 which is connected into the control circuit of the press 10 and which is effective when de-energized to prevent automatic cycling of the punch 11 from its tool change position. If the relay is de-energized while the press is in a working cycle, the punch is automatically stopped and the press is shut down.

Accordingly, the relay 70 is de-energized whenever the door 29 is open and thus prevents automatic cycling of the punch 11 until the door is closed to aline the strike 41 with the latch finger 40. Should the strike break or pull loose from the door during the punching operation, the punch 11 will be immediately stopped if the door flies open and causes de-energization of the relay.

In addition to guarding the safety of the press operator, the latch 40 and the sensing system 60 help prevent damage to the press 10. In most instances, the sheet metal workpiece 14 is bowed or buckled to some extend and, upon being re-positioned beneath the punch 11, pushes upwardly and laterally against the stripper plate 23 and tends to force the door 29 open. The latch keeps the door tightly closed and thus holds the stripper plate in its proper position so that the plate will not be shifted laterally and struck by the punch when the latter is advanced downwardly. If the latch or the strike 41 should fail and the door forced open during re-positioning of the workpiece, the sensing system 60 will stop automatic cycling of the machine and prevent downward shifting of the punch. Thus, there is little danger of the punch striking and jamming against the stripper plate 23.

Extremely vertically compact mechanism 70 (FIG. 1) is provided beneath the cylinder mounting plate 20 for adjusting the stripper housing 27 upwardly and downwardly so as to enable vertical adjustment of the stripper plate 23 to accommodate workpieces of different thicknesses between the stripper plate and the die 13. As shown in FIG. 1, the adjusting mechanism 70 comprises an inner ring 71 which is telescoped over the lower end portion of a cylindrical, sleeve-like nose 73 formed integrally with and depending from the cylinder 19. The nose projects downwardly through a hole 74 in the cylinder mounting plate 20 and slidably receives the ram 16 to help guide and rigidly support the latter during reciprocation of the punch 11.

The inner ring 71 is internally threaded with threads of one hand and is externally threaded with threads of equal pitch but of the opposite hand, the ring being threaded onto the cylinder nose 73 so as to move upwardly and downwardly on the nose when rotated. Rotation of the ring in this particular instance is effected by a reversible rotary fluid motor 75 (FIG. 1) which is advantageously supported above the cylinder mounting plate 20 and whose drive shaft 76 carries a pinion 77 positioned to mesh with a second pinion 79 on the upper end of an upright shaft 80 projecting downwardly through the cylinder mounting plate 20. A gear 81 is fastened to the shaft 80 immediately below the cylinder mounting plate and meshes with gear teeth 83 formed around the outer periphery of the ring 71 just above the external threads thereon. Thus, when the motor 75 is energized, the shaft 80 is rotated to turn the ring 71 and cause the latter to thread upwardly and downwardly on the cylinder nose 73.

Threaded onto the external threads of the inner ring 71 is a non-rotatable outer ring 85 (FIG. 1) which is connected to the stripper housing 27 by means of angularly spaced shear pins 86 (FIG. 1) extending radially between the stripper housing and the outer ring. If the punch 11 should happen to strike the stripper plate 23 during the downstroke of the punch, the shear pins 86 will fracture to allow the housing 27 to pull loose from the outer ring 85 and, as a result, the ram 16 can complete its downstroke and the housing 27 will not be damaged by the punch jamming against the stripper plate.

To prevent rotation of the stripper housing 27 and the outer ring 85, a radially projecting bracket 87 is attached rigidly to the outer ring and is formed with a hole 88 which slidably and rotatably receives the lower end portion of the shaft 80. Thus, the shaft is free to rotate within the bracket but prevents turning of the outer ring 85 and permits the latter to move upwardly and downwardly.

With the foregoing arrangement, lowering of the stripper plate 23 is effected by driving the motor 75 in one direction so as to turn the inner ring 71 and cause the latter to thread downwardly on the cylinder nose 73. The outer ring 85 and the stripper housing 27 are carried downwardly with the inner ring and, being held against rotation, the outer ring also threads downwardly on the inner ring. Accordingly, the stripper housing 27 and the stripper plate 23 are shifted downwardly through a distance which is twice as great as importantly, the downward displacement of the inner ring 71. Upward adjustment of the stripper plate is carried out in a similar manner by driving the motor in the opposite direction to cause the rings to thread upwardly.

As a result of the two threaded rings 71 and 85, the stripper plate 23 may be lowered through small increments and over a relatively wide range by moving the inner ring only a short distance downwardly from the cylinder mounting plate 20. Because the outer ring 85 is threaded onto the inner ring 71, the two rings are nested radially not only with one another but also with the cylinder nose 73 and thus the adjusting mechanism 70 is very compact in a vertical direction. Such compactness enables a reduction in the vertical distance between the die 13 and the bottom of the cylinder mounting plate 20 to permit the use of a comparatively short ram 16. The short ram thus is less likely to deflect laterally under the lateral forces exerted on the ram as the punch 11 impacts against the workpiece 15 during the nibbling operation and, in addition, lateral forces of smaller magnitude are transmitted back to the cylinder 19 by the ram. Accordingly, the ram itself is comparatively rigid and remains rigidly supported in the cylinder.

The rigidity of the lateral support of the ram 16 is increased still further by means of an upwardly projecting rod 90 (FIGS. 1 and 7) which is integral with the upper end of the piston 21. As shown in FIG. 1, the rod 90 extends upwardly out of the upper end of the cylinder 19 and is guided for up and down sliding by a cap 91 connected to the cylinder and closing off the upper end thereof. By virtue of the rod being guided within the cap 91, additional radial support is provided to counteract the lateral forces imposed on the ram 16 during the nibbling operation and to resist cocking of the ram and the piston 21 in the cylinder 19.

In accordance with the primary aspect of the invention, the ram 16 is oriented and locked in a precisely predetermined angular position in the cylinder 19 by rugged and comparatively trouble-free mechanism 95 (FIGS. 2, 6 and 7) which acts on the upwardly projecting rod 90 to orient and lock the ram. Orientation of the ram in the cylinder enables proper angular orientation of the punch 11 and, with the orienting and locking mechanism 95 acting on the rod 90 and being located above the cylinder mounting plate 20, the area below the plate is unencumbered by the mechanism to help maintain a comparatively short vertical dimension between the plate and the die 13 so that a short ram may be used.

In this instance, the orienting and locking mechanism 95 comprises a cup-shaped collar 96 (see FIG. 7) which is telescoped onto the upper end portion of the rod 90 and is anchored thereto by angularly spaced screws 97. A depending pin 99 is rigid with the collar and fits tightly into a keyway 100 in the upper end of the rod to locate the collar in a precise angular position on the rod.

Telescoped over the lower end portion of the collar 96 is a ring 101 (FIG. 7) which is fastened to the collar by radially extending pins 103 and is held in an accurately established angular position on the collar by a square key 104 fitted into a keyway 105 in the side of the collar. A split ring 106 is telescoped over the upper end portion of the collar 96 immediately above the lower ring 101 and is adapted to be clamped securely to the collar by a bolt 107. When the bolt is loosened, the collar 96 may be turned within the split ring 106 to enable angular orientation of the rod 90 and the ram 16.

As shown in FIGS. 2 and 7, the lower ring 101 is formed with a radially projecting arm 110 which is disposed immediately below an arm 111 projecting radially from and formed integrally with the split ring 106. The arm 111 is held in an angularly fixed position and, when the split ring 106 is unclamped from the collar 96, the arm 110 may be adjusted angularly relative to the fixed arm 111. To enable adjustment of the arm 110, an upright dowel 113 is press-fitted into a hole 114 (FIG. 2) in the arm 110 and projects upwardly into an enlarged hole 115 formed in the arm 111. Two adjusting screws 116 are threaded into radially extending holes 117 in the arm 111 and are positioned with their free ends or tips in engagement with the dowel 113. When the split ring 106 is unclamped, one of the adjusting screws may be loosened and the other tightened to shift the dowel 113 within the hole 115 and thereby adjust the ring 101, the collar 96 and the rod 90 angularly relatively to the angularly fixed split ring. In this way, the ram 16 may be adjustably oriented in a proper angular position within the cylinder 19. AFter the ram has been oriented, both adjusting screws 116 After tightened against the dowel 113 and are clamped in place by lock nuts 119 located between the sides of the arm 111 and the heads of the screws. The split ring 106 then is tightened by means of the bolt 107 and clamps securely against the collar 96 to prevent turning of the rod 90 and the ram 16.

To hold the arm 106 in an angularly fixed position, a hardened post 120 (FIGS. 6 and 7) of square cross-section is anchored to a plate 121 connected to the cylinder cap 91. The post projects upwardly from the plate, is disposed alongside the outer end of the arm 106 and coacts with two anti-friction rollers 123 and 124 to guide the arm for up and down reciprocation with the rod 90 while preventing turning of the arm. As shown in FIG. 6, the anti-friction rollers are journaled on the free outer end of the arm 106 and are located on opposite sides of the post 120 to ride up and down on the latter when the arm is moved upwardly and downwardly as the rod 90 is reciprocated. The rollers fit snugly against the sides of the post and thus prevent the arm 106 from turning angularly relative to the post.

With the foregoing arrangement, the rollers 123 and 124 establish a rolling connection between the arm 106 and the post 120 to avoid the use of a sliding guide connection for the arm and hence virtually eliminate the creation of heat at the connection as the rod 90 is reciprocated at rapid rates ranging upwardly to 600 strokes per minute. Because the arm 106 remains angularly stationary when the rod 90 is adjusted by the screws 116, the rollers always remain in face-to-face contact with the sides of the square post 120 and thus always roll smoothly along the post without cocking or binding and without being subjected to excessive wear as otherwise would occur in the case of line contact between the rollers and the post. The two adjusting screws 116 are capable of shifting the rod 90 angularly through small, precise increments and thus the angular position of the rod may be accurately established to insure proper angular orientation of the punch 11.

As mentioned above, encumbrance between the die 13 and the cylinder mounting plate 20 is reduced by locating the orienting and locking mechanism 95 above the mounting plate and by arranging the mechanism to act on the upwardly projecting rod 90. Such encumbrance is reduced still further using the rod to actuate means for signaling the vertical position of the punch 11. Herein, these means comprise two proximity switches 130 and 131 (FIGS. 6 and 7) supported in vertically and horizontally spaced relation on a bracket 133 upstanding from the plate 121. A second bracket 134 is anchored to and projects outwardly from the arm 106 and carries a pair of horizontally spaced lugs 135 and 136 which move upwardly and downwardly past the switches as the punch 11 is reciprocated. When a tool changing operation is to be performed, the lug 135 triggers the switch 130 when the punch has been shifted upwardly to its tool changing position, and the switch produces an electrical signal to stop the ram 16 with the punch in that position. When the punch has shifted downwardly into the die 13 a predetermined distance during the normal working stroke of the punch, the lug 136 triggers the switch 131 to produce a signal causing the ram to reverse directions and shift the punch upwardly.

To effect reversal of the ram 16 when the punch 11 is shifted upwardly to its normally retracted position (FIG. 3), a proximity switch 140 is supported on the upper cylinder 30 of the stripper housing 27 and is adapted to be triggered by a lug 141 which is carried on the punch holder 15. While the proximity switch 140 is carried on and adjustable vertically with the stripper housing 27 for the advantageous purpose disclosed in the aforementioned application, the switches 130 and 131 of the present punch press 10 are removed from the housing and are located above the cylinder mounting plate 20 so that the area below the plate is not encumbered by such switches.

We claim as our invention:

1. A punch press having a vertically reciprocable punch adapted to coact with an underlying die to punch a hole in an intervening workpiece, said press comprising a support, and upright cylinder mounted on said support, a piston slidable upwardly and downwardly within said cylinder, a ram projecting downwardly from said piston and out of the lower end of said cylinder and carrying said punch on its lower end, a rod rigid with the upper end of said piston and projecting upwardly through and journaled slidably in the upper end of said cylinder to help resist the lateral forces imposed on said ram when said punch engages said workpiece, and mechanism connected between said support and the projecting upper end portion of said rod for adjustably orienting the rod and the ram in a selected angular position within said cylinder and for thereafter anchoring the rod and the ram in said selected position.

2. A punch press as defined in claim 1 in which said mechanism comprises a first arm anchored to and projecting radially from the upper end of said rod, a second arm clamped releasably to and projecting radially from the upper end of said rod, means rigid with said support for holding said second arm in a fixed angular position and for guiding said second arm for up and down movement when said rod is reciprocated upwardly and downwardly, and means operable when said second arm is unclamped from said rod to adjust said first arm angularly relative to said second arm and thereafter to hold said first arm in its adjusted position thereby to orient and hold said rod and ram in said selected angular position.

3. A punch press as defined in claim 2 in which said holding and guiding means comprise and upstanding post rigid with said support, and rollers rotatably mounted on said second arm and positioned to ride upwardly and downwardly on said post.

4. A punch press as defined in claim 3 in which said post is formed with flat sides along which said rollers ride.

5. A punch press as defined in claim 2 further including a first ring rigid with said first arm and telescoped over the upper end portion of said rod, and means for anchoring said first ring in a fixed angular position relative to said rod.

6. A punch press as defined in claim 5 further including a second ring rigid with said second arm and telescoped over the upper end portion of said rod, and means for clamping said second ring tightly to said rod and selectively releasable to permit angular adjustment of the rod within the second ring.

7. A punch press as defined in claim 6 in which said adjusting means comprise a pin rigid with one of said arms and projecting axially into an enlarged hole in the other of said arms, and adjusting screws threaded into said other arm and projecting radially into said hole and into engagement with opposite sides of said pin.

8. A punch press as defined in claim 1 further including signal producing means anchored to said support above said cylinder, and means carried by said rod and operable to trigger said signal producing means when the rod shifts to a predetermined vertical position.

9. A punch press comprising a support, a cylinder mounted on said support, a piston movable back and forth within said cylinder and operable to reciprocate a punch, a rod rigid with said piston and projecting out of one end of the cylinder, and mechanism connected between said support and said rod for adjustably orienting the rod and the piston in a selected angular position in said cylinder and for thereafter anchoring the rod and the piston in said selected position, said mechanism comprising a first arm anchored to and projecting radially from the rod, a second arm clamped releasably to and projecting radially from the rod, a post anchored to said support and extending parallel to the direction of movement of said rod, rollers carried on said second arm and ridable along said post to hold said second arm in a fixed angular position while allowing reciprocation of said second arm with said rod, and means operable when said second arm is unclamped from said rod to adjust said first arm angularly relative to said second arm and thereafter to hold said first arm in its adjusted position thereby to orient and hold said rod and said piston in said selected angular position.

* * * * *